United States Patent
Jung et al.

(10) Patent No.: US 10,450,458 B2
(45) Date of Patent: Oct. 22, 2019

(54) POLYMER COMPOSITION, ELECTRONIC DEVICE AND METHOD OF MANUFACTURING THE SAME

(71) Applicant: Samsung Electronics Co., Ltd, Gyeonggi-do (KR)

(72) Inventors: Moon Il Jung, Gyeonggi-do (KR); In Kim, Gyeonggi-do (KR); Kyeong Pang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 15/340,001

(22) Filed: Nov. 1, 2016

(65) Prior Publication Data

US 2017/0158856 A1 Jun. 8, 2017
US 2018/0002525 A9 Jan. 4, 2018

(30) Foreign Application Priority Data

Dec. 4, 2015 (KR) .................. 10-2015-0172114

(51) Int. Cl.
| | | |
|---|---|---|
| C08L 23/00 | (2006.01) |
| C08L 75/04 | (2006.01) |
| B29C 48/03 | (2019.01) |
| B29B 9/10 | (2006.01) |
| B29C 45/00 | (2006.01) |
| C08L 77/06 | (2006.01) |
| C08L 77/02 | (2006.01) |
| G02B 27/00 | (2006.01) |
| G06F 15/00 | (2006.01) |
| C08G 67/02 | (2006.01) |
| B29C 48/04 | (2019.01) |
| B29C 48/05 | (2019.01) |
| B29C 48/285 | (2019.01) |
| B29K 83/00 | (2006.01) |
| B29K 101/12 | (2006.01) |
| B29L 31/34 | (2006.01) |

(52) U.S. Cl.
CPC ............... *C08L 75/04* (2013.01); *B29B 9/10* (2013.01); *B29C 45/0001* (2013.01); *B29C 48/03* (2019.02); *C08G 67/02* (2013.01); *C08L 77/02* (2013.01); *C08L 77/06* (2013.01); *G02B 27/00* (2013.01); *G06F 15/00* (2013.01); *B29C 48/04* (2019.02); *B29C 48/05* (2019.02); *B29C 48/297* (2019.02); *B29C 2948/92704* (2019.02); *B29C 2948/92857* (2019.02); *B29K 2083/00* (2013.01); *B29K 2101/12* (2013.01); *B29K 2995/0056* (2013.01); *B29L 2031/34* (2013.01); *C08L 2203/206* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,839,437 A | * | 6/1989 | Gergen | ............... C08L 73/00 525/211 |
| 6,150,474 A | * | 11/2000 | Stoppelmann | .......... C08L 73/00 525/420 |
| 6,251,982 B1 | | 6/2001 | Masse et al. | |
| 6,569,955 B1 | | 5/2003 | Brewer et al. | |
| 2002/0006998 A1 | | 1/2002 | Furukawa et al. | |
| 2004/0014888 A1 | | 1/2004 | Fournier et al. | |
| 2008/0058460 A1 | | 3/2008 | Tonge et al. | |
| 2011/0281984 A1 | | 11/2011 | Garois et al. | |

FOREIGN PATENT DOCUMENTS

| | | |
|---|---|---|
| WO | 2015066138 A1 | 5/2015 |
| WO | WO 2015/073925 A2 * | 5/2015 |

OTHER PUBLICATIONS

Communication pursuant to Article 94(3) EPC dated Nov. 23, 2017 in connection with European Patent Application No. 16 176 494.9.
European Patent Office, "European Search Report," Application No. EP 16176494, dated Apr. 4, 2017, 8 pages, Munich, EPO.
European Patent Office, "Communication pursuant to Article 94(3) EPC," Application No. EP16176494.9, dated Jul. 22, 2019, 6 pages.

* cited by examiner

*Primary Examiner* — Ana L. Woodward (57) ABSTRACT

The present disclosure relates to a polymer composition including eco-friendly materials, an electronic device and a method of manufacturing the same.
The polymer composition according to an aspect of the present disclosure includes a thermoplastic resin at 30 to 70 parts by weight; an eco-friendly resin, including a bio-resin, at 1 to 50 parts by weight; and a silicone resin at 1 to 60 parts by weight based on the total weight of the polymer composition.

14 Claims, 11 Drawing Sheets

POLYMER COMPOSITION, ELECTRONIC DEVICE AND METHOD OF MANUFACTURING THE SAME

CROSS-REFERENCE TO RELATED APPLICATION AND CLAIM OF PRIORITY

The present application is related to and claims benefit of Korean Patent Application No. 2015-0172114, filed on Dec. 4, 2015 in the Korean Intellectual Property Office, the entirety of which is incorporated herein by reference.

TECHNICAL FIELD

Embodiments of the present disclosure relate to a polymer composition including eco-friendly materials, an electronic device and a method of manufacturing the same.

BACKGROUND

With the recent advances in the electronics and telecommunications industries, imaging devices and portable wireless terminals are being smaller, slimmer, lighter and high definition, and tend to become multifunctional.

Accordingly, there is a need for development in material design which maintains the hardness of slimmer products, has rheological characteristics not affecting product formability in a process, and has environmental friendliness to meet the needs of consumers.

Currently, with the increase in use of a wearable device, elastomeric materials in direct contact with the skin of people are being required to have improved durability as well as wearing comfort. In this regard, in addition to the improvement in durability and wearing comfort of elastomeric materials, there is a need for research and development such that no skin problem is caused where the skin is in contact with the elastomeric materials.

SUMMARY

To address the above-discussed deficiencies, it is a primary object to provide a polymer composition, electronic device, and method of manufacturing the same.

An aspect of the present disclosure is directed to providing a polymer composition prepared by blending a thermoplastic resin such as thermoplastic polyurethane (TPU) with an eco-friendly resin, an electronic device and a method of manufacturing the electronic device. Here, the eco-friendly resin may include a bio-resin such as a PA11 resin derived from castor bean and a corn-derived resin, or a polyketone resin prepared using carbon monoxide as a raw material.

Another aspect of the present disclosure is directed to providing a polymer composition prepared by blending a silicone resin at a certain level, an electronic device and a method of manufacturing the electronic device.

A polymer composition according to an aspect of the present disclosure includes: a thermoplastic resin at 30 to 70 parts by weight; an eco-friendly resin, including a bio-resin, at 1 to 50 parts by weight; and a silicone resin at 1 to 60 parts by weight based on the total weight of the polymer composition.

Further, the bio-resin may include at least one of a PA11 resin derived from castor bean and a corn-derived resin.

Further, the corn-derived resin may include an inedible corn-derived ingredient including polyether glycol.

Further, the eco-friendly resin may include a polyketone resin prepared using carbon monoxide as a raw material.

Further, the thermoplastic resin may include at least one selected from the group consisting of a thermoplastic polyurethane (TPU) resin, a thermoplastic polyolefin (TPO) resin, a thermoplastic elastomer resin, a rubber-modified styrene-based resin, a polyol-based resin, a polycarbonate (PC)-based resin, an ether-based resin, an ester-based resin, ethylene octane rubber (EOR) and a polypropylene (PP)-based thermoplastic vulcanizate (TPV).

Further, the polymer composition may have a tensile strength of 10 kilogram-force kgF) or greater.

Next, an electronic device according to an aspect of the present disclosure includes a polymer composition containing a thermoplastic resin at 30 to 70 parts by weight, an eco-friendly resin, including a bio-resin, at 1 to 50 parts by weight and a silicone resin at 1 to 60 parts by weight based on the total weight of the polymer composition.

Further, the bio-resin may include at least one of a PA11 resin derived from castor bean and a corn-derived resin.

Further, the corn-derived resin may include an inedible corn-derived ingredient including polyether glycol.

Further, the eco-friendly resin may include a polyketone resin prepared using carbon monoxide as a raw material.

Further, the thermoplastic resin may include at least one selected from the group consisting of a thermoplastic polyurethane (TPU) resin, a thermoplastic polyolefin (TPO) resin, a thermoplastic elastomer resin, a rubber-modified styrene-based resin, a polyol-based resin, a polycarbonate (PC)-based resin, an ether-based resin, an ester-based resin, ethylene octane rubber (EOR) and a polypropylene (PP)-based thermoplastic vulcanizate (TPV).

Further, the electronic device may have a tensile strength of 10 kgF or greater.

Further, the electronic device may include a wearable device.

Next, a method of manufacturing an electronic device according to an aspect of the present disclosure includes: mixing a thermoplastic resin at 30 to 70 parts by weight, an eco-friendly resin, including a bio-resin, at 1 to 50 parts by weight and a silicone resin at 1 to 60 parts by weight based on the total weight of the polymer composition; introducing the mixed polymer composition into a hopper of an extruder to produce the polymer composition in pellet form; and introducing the pellet into an injection molding device for injection molding.

Further, the injection molding may include: inserting the pellet into a hopper of the injection molding device; melting the inserted pellet; and providing the melted polymer composition to a mold.

Further, the bio-resin may include at least one of a PA11 resin derived from castor bean and a corn-derived resin.

Further, the corn-derived resin may include includes an inedible corn-derived ingredient including polyether glycol.

Further, the eco-friendly resin may include a polyketone resin prepared using carbon monoxide as a raw material.

Further, the thermoplastic resin may include at least one selected from the group consisting of a thermoplastic polyurethane (TPU) resin, a thermoplastic polyolefin (TPO) resin, a thermoplastic elastomer resin, a rubber-modified styrene-based resin, a polyol-based resin, a polycarbonate (PC)-based resin, an ether-based resin, an ester-based resin, ethylene octane rubber (EOR) and a polypropylene (PP) based thermoplastic vulcanizate (TPV).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS disclosure For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device or system for manufacturing the same. The embodiments described in this specification and configurations illustrated in drawings are only examples and it is to be understood that the disclosure covers various equivalents, modifications, and substitutions of the embodiments and drawings of the present specification at the time of filing of this application.

Hereinafter, examples of a polymer composition, an electronic device and a method of manufacturing the electronic device according to the disclosed disclosure will be described in detail.

The polymer composition according to the disclosed disclosure is for implementing an elastomeric material for a wearable device. According to the polymer composition in accordance with an embodiment, an elastomeric material for a wearable device may be implemented by using an eco-friendly resin component having high hardness. Moreover, products may have environmental friendliness by blending a polyketone which is an eco-friendly material recycled as a polymer material with other materials, which is then applied to the products.

Hereinafter, the polymer composition according to the disclosed disclosure will be described in detail, and then an electronic device molded using this polymer composition as a raw material and a method of manufacturing the electronic device will be described.

The polymer composition according to various embodiments of the present disclosure includes an eco-friendly resin including a bio-resin at 1 to 50 parts by weight, a thermoplastic resin at 30 to 70 parts by weight and a silicone resin at 1 to 60 parts by weight based on the total weight of the polymer composition.

The eco-friendly resin is a resin having reduced hazardous substances which cause environmental pollution.

This eco-friendly resin may include a polyketone resin prepared using carbon monoxide as a raw material, a bio-resin, etc.

First, a polyketone resin as an eco-friendly resin will be described.

A polyketone is an alternating copolymer of carbon monoxide and an olefin. Here, the olefin denotes an unsaturated aliphatic hydrocarbon, which collectively refers to compounds containing a double bond in the carbon chain.

A polyketone has crystallinity due to carbonyl groups introduced from each of three carbon chains, and is an eco-friendly polymer material because carbon monoxide which is an air pollutant is used as a raw material thereof.

A polyketone is an engineering plastic of which the backbone is composed of only carbon atoms. A polyketone has a compact crystal structure with high crystallinity, which leads to excellent impact resistance, chemical resistance, wear resistance, fuel resistance, gas barrier properties and flame retardancy.

More specifically, a polyketone has an impact strength of about 200% or more as compared to nylon which is a general engineering plastic material. Further, a polyketone has less change in the physical properties with respect to water, and has excellent chemical resistance. Moreover, a polyketone has a wear resistance four times higher than that of a polyacetal (POM) (based on a base resin) type hard material, and thus may be used as a semi-permanent material. Furthermore, a polyketone generates water when a carbonyl group (C=O) reacts with hydrogen during combustion, thereby forming a char. The thus generated char layer blocks oxygen and heat, and a molded product manufactured using a polyketone as a raw material may have flame retardancy as a result.

This polyketone may be prepared by combining carbon monoxide and an olefin. More specifically, a polyketone may include a copolymer prepared by combining carbon monoxide and ethylene, and a terpolymer prepared by combining carbon monoxide, ethylene and propylene. The following Reaction Formulas 1 and 2 show the synthesis process of a polyketone.

A polyketone copolymer may be prepared by combining carbon monoxide and ethylene as shown in Reaction Formula 1, and a polyketone terpolymer may be prepared by combining carbon monoxide, ethylene and propylene as shown in Reaction Formula 2.

The copolymer may be used for high strength fibers, and generally has a melting point of about 260° C. and a molecular weight of about 200,000 or more. The terpolymer may be used as materials for engineering plastics after an extrusion or injection molding process, and generally has a melting point of about 220° C. and a molecular weight of about 60,000 or more. Therefore, an integer of n in Reaction Formula 1 may be an integer within the range in which the copolymer has a molecular weight of about 200,000 or more, and integers of n and m in Reaction Formula 2 may be integers within the range in which the terpolymer has a molecular weight of about 600,000 or more.

Next, the bio-resin is a resin prepared using a biomass component as a raw material. Here, biomass refers to organic resources which form animals and plants. This bio-resin may include at least one of a PA11 resin derived from castor beans and a corn-derived resin.

The PA11 resin is an aliphatic compound which may be prepared by condensation polymerization of 11-aminoundecide acid obtained from castor oil, and may be represented by the following Structural formula 1.

[Structural formula 1]

Since PA11 has a relatively long ethylene chains, PA11 has a melting point of 185° C. lower than that of other polyamides (PA). Further, PA11 has excellent hydrolysis resistance, and is resistant to many chemicals. Further, PA11 has a density of about 1.02 and is light, and has a particularly superior impact resistance.

The corn-derived resin may include an inedible corn-derived ingredient including polyether glycol.

In general, an elastomeric material for a wearable device in contact with the body is required to satisfy a texture requirement for a user while maintaining mechanical strength for durability so as to increase the wearing comfort of the device.

In this regard, a polyketone resin easily causes shrinkage or bending thereof during molding and is less flexible, and thus has difficulty in being applied to a band material of a wearable device as a single material. Further, a biomass-derived component also has difficulty in satisfying the texture requirement for a user even though mechanical properties are satisfying due to high hardness properties.

Accordingly, the polymer composition according to an embodiment of the present disclosure may be provided by blending with other materials for enhancement of mechanical properties and the texture improvement for user convenience.

More specifically, mechanical properties may be improved by mixing a polyketone resin with a thermoplastic resin. Further, tactile properties may be enhanced by mixing a silicone resin and a thermoplastic resin with a PA11 resin, and mechanical properties and tactile properties may be improved by mixing a corn-derived resin with a thermoplastic resin.

The thermoplastic resin is a resin which may be further modified in shape by applying heat again after being molded by applying heat, and is a base material of the polymer composition according to various embodiments of the present disclosure.

This thermoplastic resin may be included at 30 to 70 parts by weight based on the total weight of the polymer composition. When the content of the thermoplastic material is less than a reference value, moldability or texture quality of products may be reduced. When the content of the thermoplastic material is more than a reference value, moldability may decrease, or manufacturing time, cost or the like may increase. Therefore, it is preferable to add a suitable weight of the thermoplastic resin based on the total weight of the polymer composition.

The thermoplastic resin may include a thermoplastic polyurethane (TPU) resin, a thermoplastic polyolefin (TPO) resin, a thermoplastic elastomer resin, a rubber-modified styrene-based resin, a polyol-based resin, a polycarbonate (PC)-based resin, an ether-based resin, an ester-based resin, ethylene octane rubber (EOR) and a polypropylene (PP) based thermoplastic vulcanizate (TPV) or the like, but available examples of the thermoplastic resin are not limited thereto.

This thermoplastic resin may be used alone or in mixtures thereof. When many types of the thermoplastic resins are used according to the embodiment, a compatibilizer may be used for increasing miscibility between the resins. According to the embodiment, of course, a compatibilizer may be used for increasing miscibility between the thermoplastic resin and the other resins.

When this compatibilizer is used, interfacial tension between the resins is reduced due to the compatibilizer, and thus interfacial bond strength may increase. Accordingly, excellent mechanical properties may be ensured by adding the compatibilizer.

A block copolymer of material of which miscibility is required to be increased may be used as the compatibilizer. Further, a method of bonding acid and basic groups to each material of which miscibility is required to be increased, of course, may be performed.

The silicone resin is a thermoplastic synthetic resin having silicon in form of a siloxane bond alternating silicone and oxygen as a backbone, in which a methyl group, a phenyl group, a hydroxyl group or the like are added to silicon.

In general, a silicone resin has excellent covering power, and thus is used as a release agent when molding metal, and may provide water repellency to organic and inorganic substances. Moreover, the silicone resin is physiologically harmless, and thus may be used in cosmetics and pharmaceuticals, and serves to remove bubbles in a solvent. Accordingly, shore hardness properties may be ensured and tactile properties may be improved by suitably controlling the content of the silicone resin in the polymer composition.

This silicone resin may be included at 1 to 60 parts by weight based on the total weight of the polymer composition. When the content of the silicone resin is more than a reference value, fluidity is increased and hardness properties may be degraded. When the content of the silicone resin is less than a reference value, tactile properties may be difficult to be improved. Therefore, it is preferable to add a suitable weight of the silicone resin based on the total weight of the polymer composition.

Furthermore, the polymer composition may further include an additive according to the embodiment, and at least one selected from the group consisting of thermal stabilizers, UV stabilizers, antioxidants, lubricants, surface stabilizers, flame retardants, carbon blacks, pigments, waxes, and deodorants may be used as an additive.

The thermal stabilizer, UV stabilizer and antioxidant are chemicals added to prevent or suppress degradation of the polymer composition. The thermoplastic resin of the polymer composition according to the embodiment of the present disclosure may be formed of plastic components. Since these plastic components are degraded under the influence of heat, light, oxygen or the like, there is a need for prevent this. Therefore, the polymer composition according to various embodiments of the present disclosure may further include the thermal stabilizer, the UV stabilizer or the antioxidant.

The lubricant is a drug added to improve fluidity of the polymer composition during thermoforming thereof, or to facilitate the extraction of a molded product from a mold (rapping). The polymer composition according to various embodiments of the present disclosure may include a softener or a plasticizer mainly aimed to improve plasticity during processing, and may include a release agent for ease of rapping.

The surface stabilizer is an additive added to form a smooth surface when manufacturing a molded product using the polymer composition. The polymer composition according to various embodiments of the present disclosure may include the surface stabilizer to enhance surface properties of products.

The flame retardant is an additive added to improve flame resistance of the polymer composition, and may be used by a method of applying the flame retardant on the surface of the molded product according to the embodiment. Since plastic is easily burned and toxic gases are generated during combustion, the flame retardant may be added to prevent this.

The polymer composition according to various embodiments of the present disclosure was described above. Types and composition ratios of the polymer composition are not limited to the above-described examples, and should be construed as a concept encompassing all modifications that may be easily thought by those skilled in the art.

Next, physical-property measurement results for examples and comparative examples will be described to help understanding of the present disclosure.

For the physical property test, the polymer compositions including components at contents shown in Tables 1 and 2 according to examples and comparative examples were mixed using a HENSCHEL-MIXER® mixing machine and dispersed uniformly. Subsequently, the dispersed polymer compositions were extrusion-molded using an extruder to produce the polymer compositions in pellet form, and the prepared pellets were dried and injection-molded to prepare samples for physical property testing.

TABLE 1

|  | TPU resin | PA11 resin | Si resin |
|---|---|---|---|
| Example 1 | 45 | 45 | 10 |
| Example 2 | 40 | 40 | 20 |
| Example 3 | 35 | 35 | 30 |
| Comparative Example 1 | 50 | 50 | 0 |

TABLE 2

|  | TPU resin | PA11 resin | Polyketone resin |
|---|---|---|---|
| Example 4 | 47.5 | 47.5 | 5 |
| Example 5 | 45 | 45 | 10 |
| Comparative Example 2 | 50 | 50 | 0 |

Referring to Table 1, samples for physical property testing were prepared by controlling the content of the silicone resin of the polymer composition including a thermoplastic polyurethane resin (hereinafter, referred to as a TPU resin) and a PA11 resin in Examples 1 to 3 and Comparative Example 1.

Referring to Table 2, samples for physical property testing were prepared by controlling the content of the polyketone of the polymer composition including a TPU resin and a PA11 resin in Examples 4 to 5 and Comparative Example 2.

More particularly, composition ratios of the polymer compositions used in Examples 1 to 5 and Comparative Examples 1 to 2 are as follows.

Example 1

A sample for physical property testing was prepared using a polymer composition including a TPU resin at 45 parts by weight, a PA11 resin at 45 parts by weight and a silicone resin at 10 parts by weight based on the total weight of the polymer composition.

Example 2

A sample for physical property testing was prepared using a polymer composition including a TPU resin at 40 parts by weight, a PA11 resin at 40 parts by weight and a silicone resin at 20 parts by weight based on the total weight of the polymer composition.

Example 3

A sample for physical property testing was prepared using a polymer composition including a TPU resin at 35 parts by weight, a PA11 resin at 35 parts by weight and a silicone resin at 30 parts by weight based on the total weight of the polymer composition.

Example 4

A sample for physical property testing was prepared using a polymer composition including a TPU resin at 47.5 parts by weight, a PA11 resin at 47.5 parts by weight and a polyketone resin at 5 parts by weight based on the total weight of the polymer composition.

Example 5

A sample for physical property testing was prepared using a polymer composition including a TPU resin at 45 parts by weight, a PA11 resin at 45 parts by weight and a polyketone resin at 10 parts by weight based on the total weight of the polymer composition.

Comparative Example 1

A sample for physical property testing was prepared using a polymer composition including a TPU resin at 50 parts by weight, a PA11 resin at 50 parts by weight and a silicone resin at 0 parts by weight based on the total weight of the polymer composition.

Comparative Example 2

A sample for physical property testing was prepared using a polymer composition including a TPU resin at 50 parts by weight, a PA11 resin at 50 parts by weight and a polyketone resin at 0 parts by weight based on the total weight of the polymer composition.

Various physical properties of samples for physical property testing prepared using the polymer compositions of Examples 1 to 5 and Comparative Examples 1 to 2 were evaluated according to the following methods.

Shore Hardness

Samples for physical property testing were fixed to be flat on an ASKER CL-150 tester, and a lever of the tester was pulled down to measure Shore Hardness measurements of the samples for physical property testing prepared using the polymer compositions of Examples 1 to 5 and Comparative Examples 1 to 2.

Tensile Strength

Tensile strengths of the samples for physical property testing prepared using the polymer compositions of Examples 1 to 5 and Comparative Examples 1 to 2 were measured according to an ISO 37 standard test.

Tear Strength

Tensile strengths of the samples for physical property testing prepared using the polymer compositions of Examples 1 to 5 and Comparative Examples 1 to 2 were measured according to an ISO 34 standard test.

Tear strengths of the samples for physical property testing prepared using the polymer compositions of Examples 1 to 5 and Comparative Examples 1 to 2 were measured.

Figure 1:
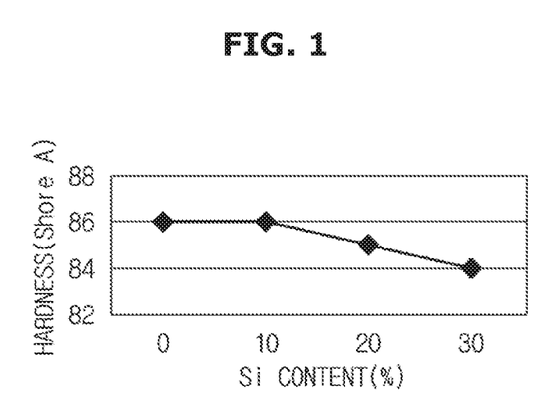
FIG. 1 illustrates a change in shore hardness of samples for physical property testing according to the content of the silicone resin.
Figure 2:
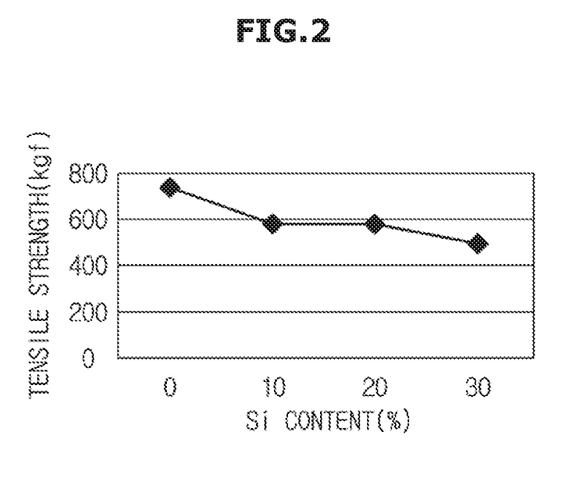
FIG. 2 illustrates a change in tensile strength of samples for physical property testing according to the content of the silicone resin.
Figure 3:
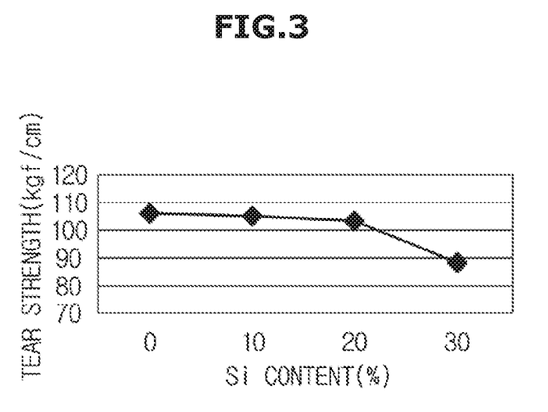
FIG. 3 illustrates a change in tear strength of samples for physical property testing according to the content of the silicone resin.

Physical-property measurement results measured according to the above-described methods were shown in FIGS. 1 to 6. More specifically, FIG. 1 illustrates a change in shore hardness of samples for physical property testing according to the content of the silicone resin, FIG. 2 illustrates a change in tensile strength of samples for physical property testing according to the content of the silicone resin, and FIG. 3 illustrates a change in tear strength of samples for physical property testing according to the content of the silicone resin.

Figure 4:
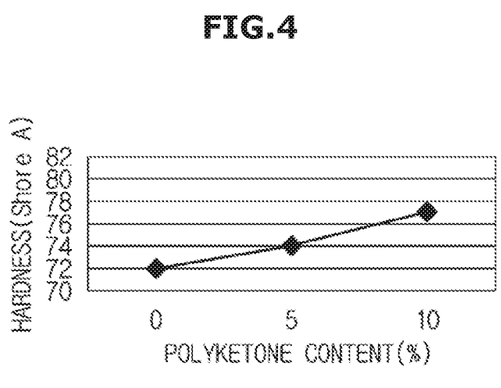
FIG. 4 illustrates a change in shore hardness of samples for physical property testing according to the content of the polyketone resin.
Figure 5:
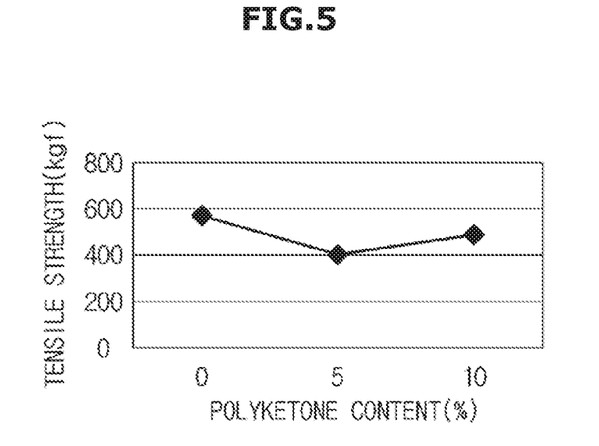
FIG. 5 illustrates a change in tensile strength of samples for physical property testing according to the content of the polyketone resin.
Figure 6:
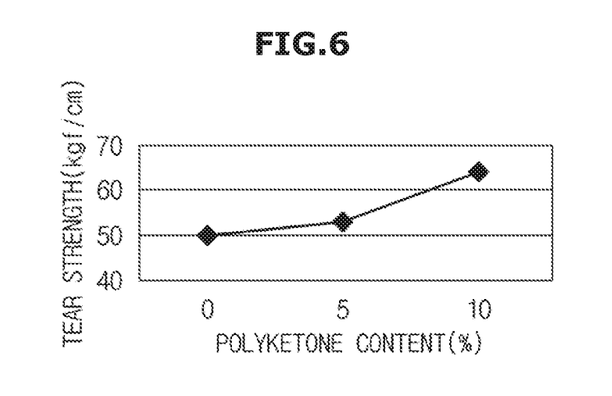
FIG. 6 illustrates a change in tear strength of samples for physical property testing according to the content of the polyketone resin.

Further, FIG. 4 illustrates a change in shore hardness of samples for physical property testing according to the content of the polyketone resin, FIG. 5 illustrates a change in tensile strength of samples for physical property testing according to the content of the polyketone resin, and FIG. 6 illustrates a change in tear strength of samples for physical property testing according to the content of the polyketone resin.

Referring to FIG. 1, it was determined that shore hardness was about 86 A and very high in the case of Comparative Example 1 in which the polymer composition includes no silicone resin.

Furthermore, it was determined that shore hardness gradually decreased as the content of the silicone resin in the polymer composition was increased from 10 parts by weight to 30 parts by weight.

That is, it was determined that shore hardness gradually decreased as the content of the silicone resin in the polymer composition was increased.

Referring to FIG. 2, it was determined that tensile strength was about 750 kilogram-force (kgf) and very high in the case of Comparative Example 1 in which the polymer composition includes no silicone resin.

Further, it was determined that tensile strength gradually decreased from about 600 kgf to about 500 kgf as the content of the silicone resin in the polymer composition was increased from 10 parts by weight to 30 parts by weight.

Referring to FIG. 3, it was determined that tear strength was about 106 kgf/cm and relatively high in the case of Comparative Example 1 in which the polymer composition includes no silicone resin.

Moreover, it was determined that tear strength gradually decreased from about 103 kgf/cm to about 89 kgf/cm as the content of the silicone resin in the polymer composition was increased from 10 parts by weight to 30 parts by weight.

Next, referring to FIG. 4, it was determined that shore hardness was 72 A and relatively low in the case of Comparative Example 2 in which the polymer composition includes no polyketone resin.

Furthermore, it was determined that shore hardness gradually increased from 74 A to 77 A as the content of the polyketone resin in the polymer composition was increased from 5 parts by weight to 10 parts by weight.

That is, it was determined that shore hardness gradually increased as the content of the polyketone resin in the polymer composition was increased.

Referring to FIG. 5, it was determined that tensile strength was about 590 kgf and relatively high in the case of Comparative Example 2 in which the polymer composition includes no polyketone resin.

Further, it was determined that tensile strength gradually increased from about 400 kgf to about 480 kgf as the content of the polyketone resin in the polymer composition was increased from 5 parts by weight to 10 parts by weight.

That is, it was determined that, tensile strength was high when the polymer composition included no polyketone resin, when the polyketone resin was added to the polymer composition, tensile strength decreased, and when the content of the polyketone resin was increased, tensile strength gradually increased.

Referring to FIG. 6, it was determined that tensile strength was about 50 kgf/cm and relatively low in the case of Comparative Example 2 in which the polymer composition includes no polyketone resin.

Moreover, it was determined that tensile strength gradually increased about 13 kgf/cm to about 63 kgf/cm as the content of the polyketone resin in the polymer composition was increased from 5 parts by weight to 10 parts by weight.

Physical property measurement results of examples and comparative examples of the polymer composition according to various embodiments of the present disclosure were described above.

Next, an electronic device including the polymer composition according to various embodiments of the present disclosure will be described.

The electronic device according to various embodiments of the present disclosure may include a polymer composition containing an eco-friendly resin including a bio-resin at 1 to 50 parts by weight, a thermoplastic resin at 30 to 70 parts by weight and a silicone resin at 1 to 60 parts by weight based on the total weight of the polymer composition.

This polymer composition may be formed in a film, sheet, pellet or fiber form to be applied as interior materials or exterior materials of the electronic device.

This electronic device may include a wearable device designed to be worn on the body, and more specifically, may be a concept including a smart watch, a smart band, a smart glass or set of smart glasses, a head set, etc. However, examples of the wearable device are not limited thereto, and may encompass modifications within the range in which those skilled in the art may easily perform embodiments of the disclosure.

Figure 7:
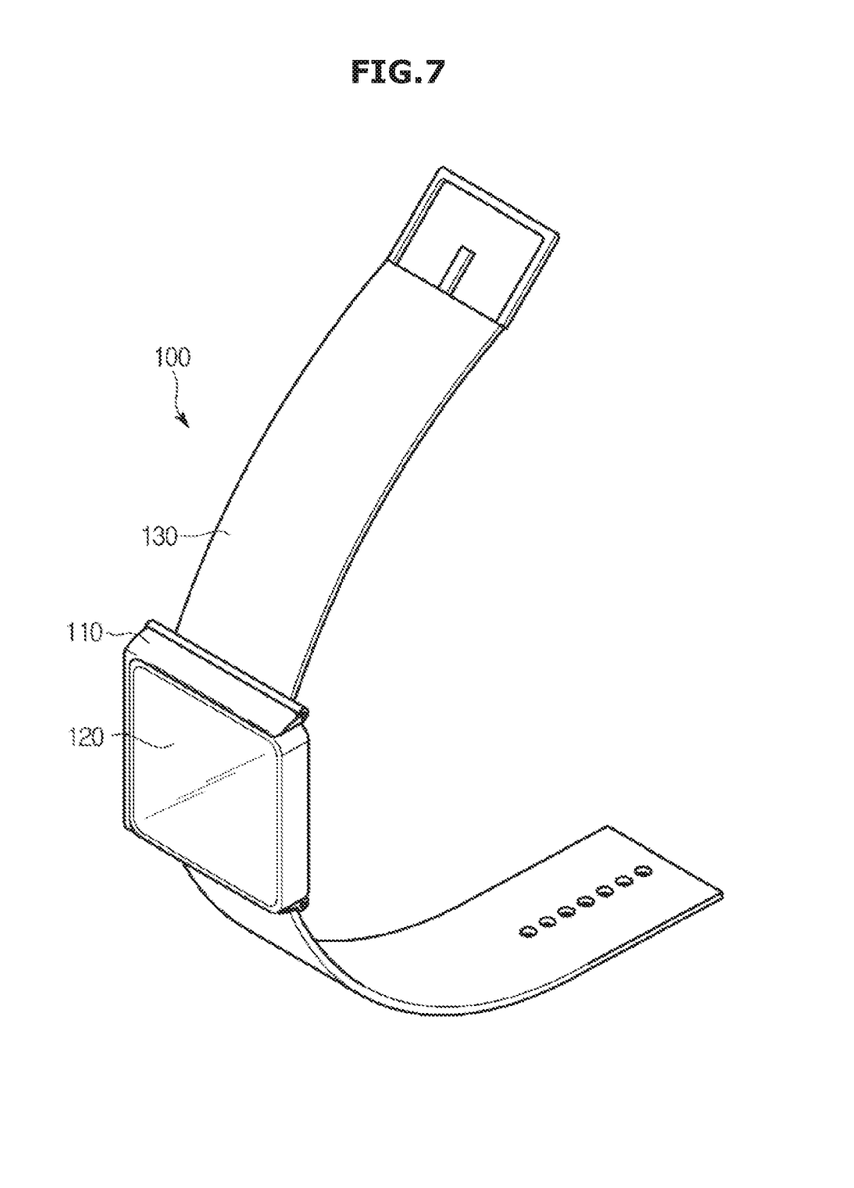
FIG. 7 illustrates a smart watch as an example of a wearable device.
Figure 8:
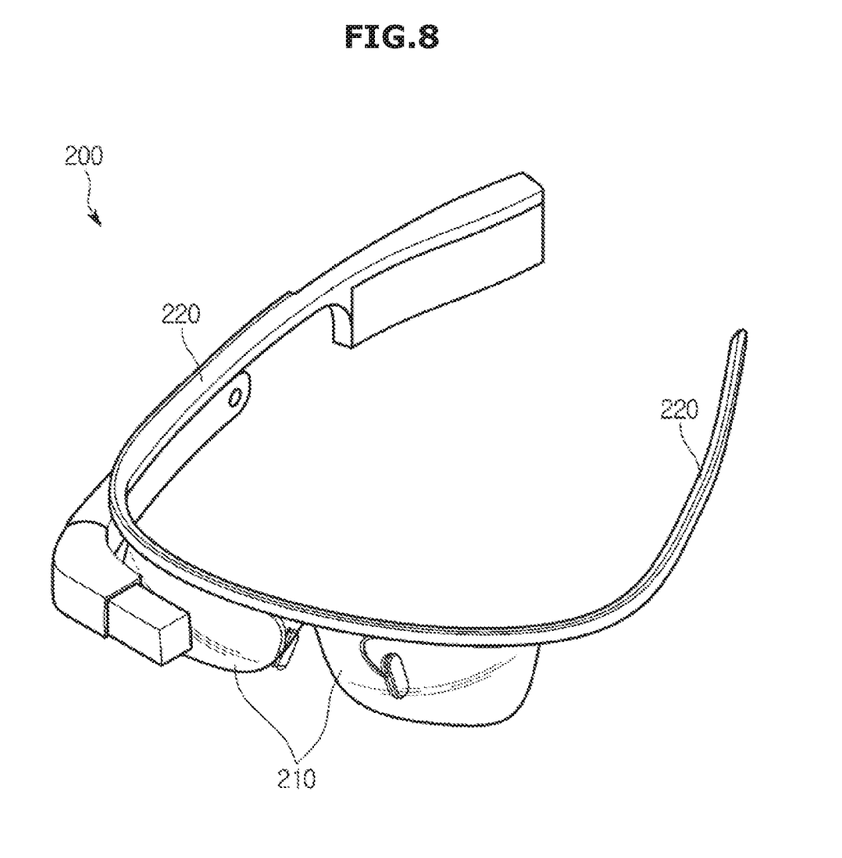
FIG. 8 illustrates smart glasses as another example of a wearable device.

FIG. 7 illustrates a smart watch 100 as an example of the wearable device, and FIG. 8 illustrates smart glasses 200 as another example of the wearable device.

Referring to FIG. 7, a wearable device may include a smart watch 100. The smart watch may include a main body 110, a display formed at a front surface of the main body 100, and a band portion 130 combined with or coupled to the main body. The polymer composition according to various embodiments of the present disclosure may be applied when manufacturing the band portion 130 of the smart watch 100.

The band portion 130 of the smart watch 100 is a portion in direct contact with the skin of the user, and to which implementation of high durability and wearing properties are critical design elements. Accordingly, wearing comfort of the smart watch 100 may be improved by applying the polymer composition according to the disclosed disclosure.

Referring to FIG. 8, a wearable device may include smart glasses 200. The smart glasses may be in the form of glasses, and may include two eyeglasses 210, and legs 220 respectively connected to the two eyeglasses 220.

The legs 220 of the smart glasses 200 may be configured to be worn on both ears of the user. The legs 220 of the smart glasses 200 are portions in direct contact with the skin of the user, and may serve as a design element of which wearing properties are critical like the band portion 130 of the smart watch 100. Therefore, wearing comfort of the smart glasses 200 may be enhanced by applying the polymer composition according to the disclosed disclosure.

Further, the legs 220 of the smart glasses 200 are required to have a hardness property higher than that of the band portion 130 of the smart watch 100. Accordingly, desired characteristics of the product may be adjusted by controlling contents of compositions included in the polymer composition.

As for components and content ratios of each component of the polymer composition used to manufacture the wearable device, redundant description with respect to the description about the above-described polymer composition will be omitted.

Examples of the electronic device including the polymer composition according to various embodiments of the present disclosure were described.

Next, a method of manufacturing the electronic device will be described.

The method of manufacturing the electronic device according to various embodiments of the present disclosure may include, first, preparing of components for the electronic device and assembling of the components. Preparing of the components for the electronic device may include manufacturing of the components for the electronic device using the above-described polymer composition.

Hereinafter, structures of an extruder 300 and an injection molding device 400 for manufacturing the components for the electronic device will be described, followed by the description of the method of manufacturing the electronic device for the ease of description.

Figure 9:
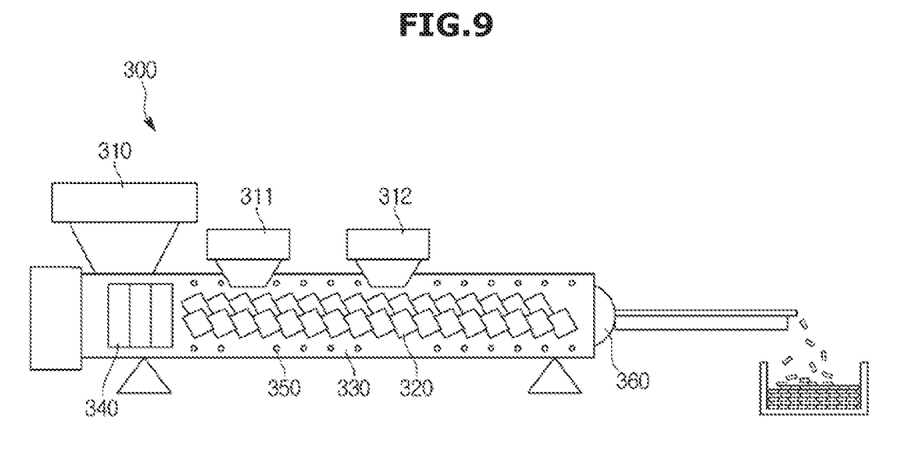
FIG. 9 illustrates a structure of an extruder according to various embodiments of the present disclosure.
Figure 10:
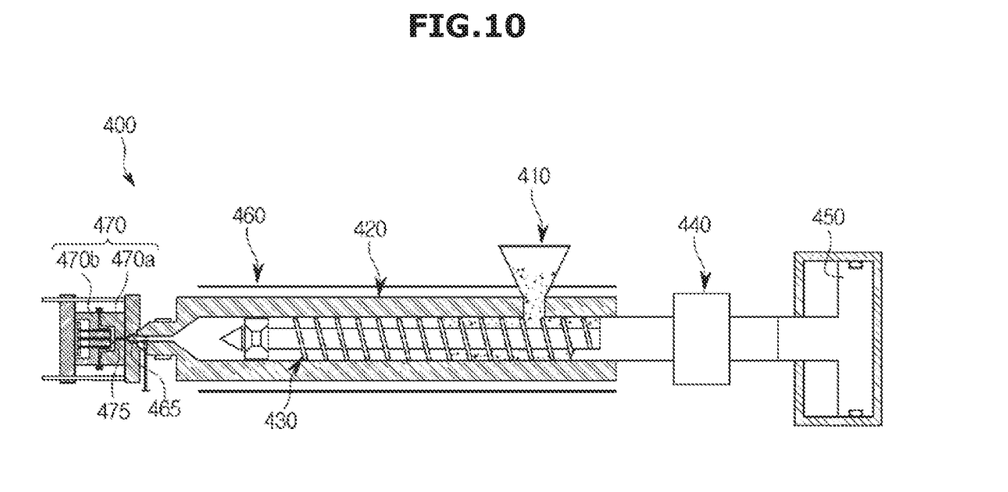
FIG. 10 illustrates a structure of an injection molding device according to various embodiments of the present disclosure.

FIG. 9 illustrates the structure of the extruder 300 according to various embodiments of the present disclosure, and FIG. 10 illustrates the structure of the injection molding device 400 according to various embodiments of the present disclosure.

Referring to FIG. 9, the extruder 300 according to various embodiments of the present disclosure may include: a hopper 310 for introducing raw materials; a first side feeder 311 and a second side feeder 312 for additionally introducing raw materials; a shaft 320 pivotably installed; an extruder cylinder 330 for accommodating the shaft 320; an extruder driving unit 340 for rotating the shaft 320; an extruder heater 350 for heating the inside of the extruder cylinder 330; a discharge die 360 for discharging a polymer composition; and an extruder control unit (not shown) for controlling the heating temperature of the extruder heater 350. As the extruder 300, a continuous flow twin screw extruder may be used as shown in FIG. 9, but the present disclosure is not limited thereto, and a continuous flow single screw extruder may also be used.

The extruder driving unit 340 may include: a motor for rotating the shaft 320; a coupling unit connected to the motor and transferring the power of the motor to a gear unit; and the gear unit for receiving the power of the motor to rotate the shaft 320. The shaft 320 driven by the extruder driving unit 340 may rotate in a predetermined direction (e.g., a clockwise direction) to apply shear stress to a melted mixture, and a rotation speed may range from 100 to 400 rpm.

A plurality of the extruder heaters 350 may be installed from a supply area to a discharge area to control the internal temperature of the extruder cylinder 330. That is, the extruder cylinder 330 may be divided into a plurality of areas to control the internal temperature in each area, and the temperature in each area may be suitably controlled depending on the raw material to be processed.

Referring to FIG. 10, the injection molding device 400 according to various embodiments of the present disclosure may include: an injection molding device hopper 410 for inserting raw materials; a barrel 420 for accommodating the raw materials inserted through the injection molding device hopper 410; a screw 430 installed to move back and forth and rotate in the barrel 420; an injection molding device motor 440 for transferring a rotational force to the screw 430; an injection molding device cylinder unit 450 connected to the screw 430 to linearly move the screw 430; an injection molding device heater 460 installed at the outer peripheral surface of the barrel 420 to heat the raw materials accommodated in the barrel 420; a nozzle 465 for supplying synthetic resin raw materials accommodated in the barrel 420 to a mold 470; and the mold 470 for receiving the raw materials from the nozzle 465 to mold a product to be molded.

The mold 470 may include a first mold 470a receiving the raw materials and a second mold 470b combined with the first mold 470a to internally form an injection cavity 475. The first mold 470a may be a fixed type mold and the second mold 470b may be a movable mold.

The extruder 300 and the injection molding device 400 for manufacturing a molded product according to various embodiments of the present disclosure were described. Next, a method of manufacturing the electronic device according to various embodiments of the present disclosure will be described.

Figure 11:
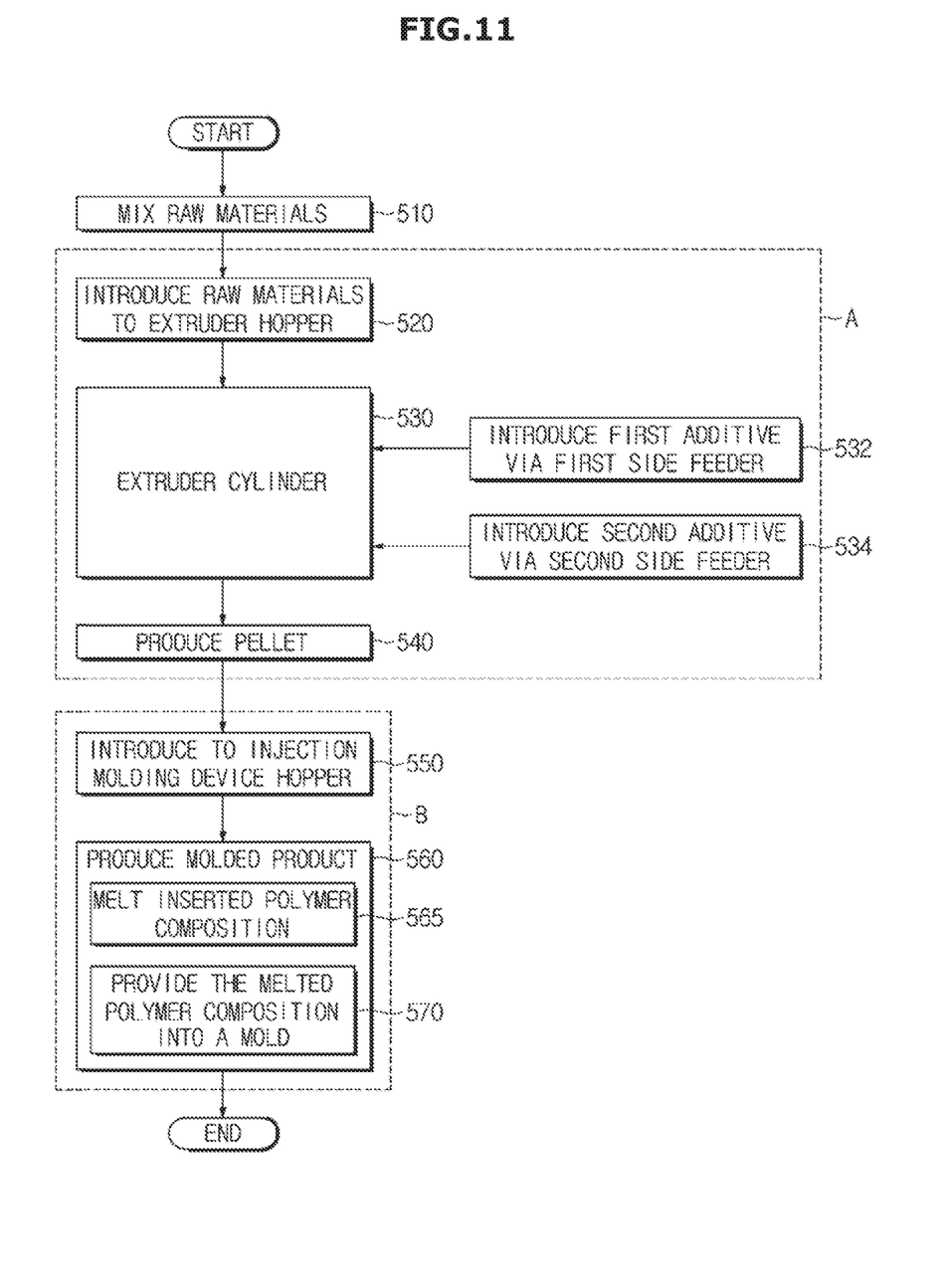
FIG. 11 illustrates a method of manufacturing the electronic device according to various embodiments of the present disclosure.

FIG. 11 illustrates a method of manufacturing the electronic device according to various embodiments of the present disclosure.

An "A" part in FIG. 11 illustrates a pellet production process performed in the extruder 300, and a "B" part in FIG. 11 illustrates a process of producing components for a wearable device performed in the injection molding device 400.

Referring to FIG. 11, first, mixing of raw materials is performed. More specifically, mixing of raw materials may include mixing of raw materials using a mixer (510), such as a HENSCHEL-MIXER® mixing machine.

Next, premixed raw materials are introduced into an extruder hopper, and the raw materials introduced into the extruder hopper are extruded in an extruder cylinder (520 and 530). Here, an additive may be separately introduced into the extruder hopper via a first side feeder or a second side feeder according to the embodiment (532 and 534).

When raw materials are introduced into the extruder hopper at the same time, since raw materials remain in the extruder longer, low thermal resistance or mechanical properties thereof may be degraded. Accordingly, the raw materials having low thermal resistance or mechanical properties may be separately introduced via the first side feeder or the second side feeder in consideration of the properties of materials, thereby preventing the materials from decomposing in the extruder.

The raw materials extruded in the extruder cylinder may be discharged through the discharge die 360, and the discharged polymer composition may be dried to produce pellets (540). The produced pellets 365 are shown in FIG. 9.

Thereafter, the produced pellets 365 are introduced into the injection molding device hopper 410 of the injection molding device 400 to perform injection molding of the polymer composition.

More specifically, injection molding of the polymer composition includes: introducing the polymer composition into the injection molding device hopper 410 of the injection molding device (550); producing a molded product (560). More specifically, producing the molded produce includes: melting the inserted polymer composition (565); and providing the melted polymer composition to the mold 470 (570).

The molded product manufactured in the injection molding device 400 may be applied to the electronic device according to various embodiments of the present disclosure. That is, the electronic device according to various embodiments of the present disclosure may be provided by assembling the molded product manufactured in the injection molding device 400 with the other components.

The electronic device manufactured using the polymer composition according to an aspect of the present disclosure can be in accord with global environment-friendly policies and meet the needs of green consumers by implementing eco-friendly materials. More specifically, the effect of reducing carbon dioxide emissions and total volatile organic compounds (TVOCs) can be achieved, and the environmental impact can be reduced because there is no harmful effect to the skin during the physical contact.

Further, the wearing comfort of the electronic device may be increased because the user can be satisfied with the texture of the device while mechanical strength of the electronic device is maintained by blending a silicone resin at a certain level.

disclosure Although the present disclosure has been described with embodiments, various changes and modifications may be suggested to one skilled in the art. It is intended that the present disclosure encompass such changes and modifications as fall within the scope of the appended claims.

What is claimed is:

1. A polymer composition, comprising:
   a thermoplastic resin at 30 to 70 parts by weight based on the total weight of the polymer composition;
   an eco-friendly resin including a bio-resin and a polyketone resin prepared using carbon monoxide as a raw material, wherein the eco-friendly resin is provided at 1 to 50 parts by weight based on the total weight of the polymer composition, wherein the bio-resin includes at least one of a PA11 resin derived from castor bean or a corn-derived resin; and
   a silicone resin at 1 to 60 parts by weight based on the total weight of the polymer composition,
   wherein the thermoplastic resin is different from the eco-friendly resin and the silicone resin.

2. The polymer composition of claim 1, wherein the corn-derived resin includes an inedible corn-derived ingredient including polyether glycol.

3. The polymer composition of claim 1, wherein the thermoplastic resin includes at least one selected from the group consisting of:
   a thermoplastic polyurethane (TPU) resin,
   a thermoplastic polyolefin (TPO) resin,
   a thermoplastic elastomer resin,
   a rubber-modified styrene-based resin,
   a polyol-based resin,
   a polycarbonate (PC)-based resin,
   an ether-based resin,
   an ester-based resin,
   ethylene octane rubber (EOR), and
   a polypropylene (PP)-based thermoplastic vulcanizate (TPV).

4. The polymer composition of claim 1, wherein a tensile strength of the polymer composition is 10 kgF or greater.

5. An electronic device comprising:
   a polymer composition which includes:
      a thermoplastic resin at 30 to 70 parts by weight based on the total weight of the polymer composition,
      an eco-friendly resin including a bio-resin and a polyketone resin prepared using carbon monoxide as a raw material, wherein the eco-friendly resin is provided at 1 to 50 parts by weight based on the total weight of the polymer composition, wherein the bio-resin includes at least one of a PA11 resin derived from castor bean and a corn-derived resin, and
      a silicone resin at 1 to 60 parts by weight based on the total weight of the polymer composition,
   wherein the thermoplastic resin is different from the eco-friendly resin and the silicone resin.

6. The electronic device of claim 5, wherein the corn-derived resin includes an inedible corn-derived ingredient including polyether glycol.

7. The electronic device of claim 5, wherein the thermoplastic resin includes at least one selected from the group consisting of:
   a thermoplastic polyurethane (TPU) resin,
   a thermoplastic polyolefin (TPO) resin, a thermoplastic elastomer resin,
a rubber-modified styrene-based resin,
a polyol-based resin,
a polycarbonate (PC)-based resin,
an ether-based resin, an ester-based resin,
ethylene octane rubber (EOR), and
a polypropylene (PP)-based thermoplastic vulcanizate (TPV).

8. The electronic device of claim 5, wherein a tensile strength of the electronic device is 10 kgF or greater.

9. The electronic device of claim 5, wherein the electronic device includes a wearable device.

10. A method of manufacturing an electronic device, the method comprising:
mixing:
a thermoplastic resin at 30 to 70 parts by weight based on the total weight of the polymer composition,
an eco-friendly resin including a bio-resin and a polyketone resin prepared using carbon monoxide as a raw material, wherein the eco-friendly resin is provided at 1 to 50 parts by weight, wherein the bio-resin includes at least one of a PA11 resin derived from castor bean and a corn-derived resin, and
a silicone resin at 1 to 60 parts by weight based on the total weight of a polymer composition;
adding the mixed polymer composition into a hopper of an extruder to produce the polymer composition in a pellet form; and
adding the pellet into an injection molding device for injection molding,
wherein the thermoplastic resin is different from the eco-friendly resin and the silicone resin.

11. The method of claim 10, further comprising performing injection molding by:
inserting the pellet into a hopper of the injection molding device;
melting the inserted pellet; and
providing the melted polymer composition to a mold.

12. The method of claim 10, wherein the corn-derived resin includes an inedible corn-derived ingredient including polyether glycol.

13. The method of claim 10, wherein the thermoplastic resin includes at least one selected from the group consisting of:
a thermoplastic polyurethane (TPU) resin,
a thermoplastic polyolefin (TPO) resin,
a thermoplastic elastomer resin,
a rubber-modified styrene-based resin,
a polyol-based resin,
a polycarbonate (PC)-based resin,
an ether-based resin, an ester-based resin,
ethylene octane rubber (EOR), and
a polypropylene (PP) based thermoplastic vulcanizate (TPV).

14. The method of claim 10, wherein the electronic device includes a wearable device; and
wherein a tensile strength of the mixed polymer composition is 10 kgF or greater.

* * * * *